July 11, 1967
G. E. WARNAKA
3,330,376
STRUCTURE ACOUSTICALLY TRANSPARENT FOR COMPRESSIONAL
WAVES AND ACOUSTICALLY DAMPED FOR
BENDING OR FLEXURAL WAVES
Filed June 11, 1965
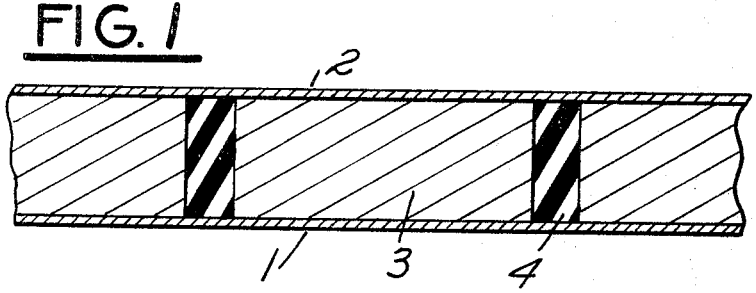
FIG. 1
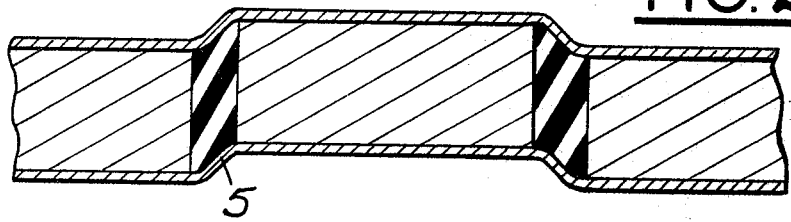
FIG. 2
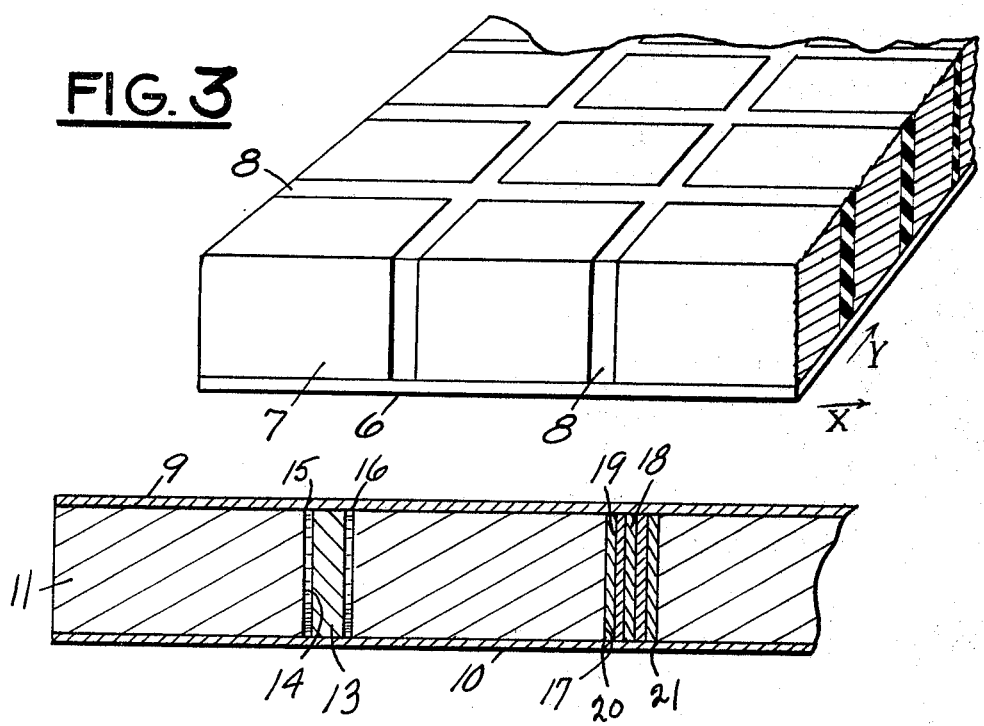
FIG. 3
FIG. 4
INVENTOR.
BY Glenn E. Warnaka
Ralph Hammar
Attorney

United States Patent Office 3,330,376
Patented July 11, 1967

3,330,376
STRUCTURE ACOUSTICALLY TRANSPARENT FOR COMPRESSIONAL WAVES AND ACOUSTICALLY DAMPED FOR BENDING OR FLEXURAL WAVES
Glenn E. Warnaka, Erie, Pa., assignor to Lord Corporation, Erie, Pa., a corporation of Pennsylvania
Filed June 11, 1965, Ser. No. 463,244
5 Claims. (Cl. 181—.5)

ABSTRACT OF THE DISCLOSURE

A composite panel having spaced flexible skins with the great majority of their opposing surfaces fixed to the ends of rigid blocks spaced from each other lengthwise and crosswise of the skins and with the spaces between the blocks filled with incompressible damping material. The structure is acoustically transparent for compressional waves perpendicular to the skins and is acoustically damped for bending or flexural waves.

This invention is intended to produce a structure which is very rigid in bending or flexure and compression and is highly damped in flexure, but has no appreciable damping in compression. One use of the structure is for sonar domes where the rigidity in compression provides efficient transmission of the sonar signal of compressional waves while the rigidity in flexure and the high damping to flexural waves prevents distortion of the sonar signal by bending or flexural waves excited by ship-borne vibration or turbulent flow.

In the drawing, FIG. 1 is a fragmentary section through a structural member for a sonar dome, FIG. 2 is a view similar to FIG. 1 showing the section deformed by a bending or flexural wave, FIG. 3 is an isometric sketch of a structure with the top skin removed in which the damping of flexural waves is different in two directions, and FIG. 4 is a fragmentary section of a modification using friction material or viscous liquid for damping of the flexural waves.

In FIG. 1, there is shown a structural member suitable for construction of a sonar dome having inner and outer skins 1 and 2 of sheet metal or some other relatively inextensible material connected by rigid blocks 3 which are welded, bonded, bolted, or otherwise rigidly fastened to the opposed faces of the structural skins 1 and 2. The gaps between the blocks 3 are filled with damping material 4 characterized by a high internal damping or loss factor as compared to the structural material 1, 2, 3. The damping material may be viscous or visco-elastic. Typically, the modulus of elasticity of the damping material 4 is one tenth, one hundredth, or a smaller fraction of the modulus of elasticity of the structural material 1, 2, 3 and the loss factor or internal damping of the damping material is ten or one hundred or more times the loss factor or internal damping of the structural material. In other words, the stiffness of the damping material is small or negligible compared to the stiffness of the structural material and the damping of the structural material is small or negligible compared to the damping of the damping material.

For a definition of loss factor, see Final Report of A.S.A. Committee S2-W-33 on "Damping of Materials." For examples of damping materials and of structural material which may be used, see "Your Selection Guide to High Damping Materials," Product Engineering, Apr. 17, 1961, pages 44–56.

When used as in a sonar dome, the structural member may be formed to the required curvature and the skins 1 and 2 may be coated. From one aspect, the structural member may comprise the acoustic transmitting core of a sonar dome. The details of construction of sonar domes and of the associated transducers are well understood and need not be illustrated for the purposes of this invention.

It is an essential feature that the width of the gaps between the blocks 3 be less than the length of the blocks. This means that the blocks 3 occupy a large majority of the area of the skins 1 and 2 while the damping material 4 occupies only a small or minor portion of the area of the skins. Because of this construction, when the over-all structure is subjected to bending, the bending is localized in the gaps between the blocks 3, as shown in FIG. 2. The length and thickness of the blocks 3, together with the rigid connections of the blocks to the relatively flexible skins 1 and 2, prevents bending of the blocks and the portions of the skins fixed to the blocks. Only the sections 5 of the skins between the blocks are subjected to bending causing shearing of the damping material 4, as shown in FIG. 2. It will be noted that the bending is non-symmetrical in the sense that there is no center of curvature or radius of curvature of the over-all structure. The local deformation or bending which occurs in the gaps between the blocks subjects the damping material 4 to shear strain and because of the high internal damping or loss factor of the damping material, flexural or bending waves are attenuated. This is advantageous in sonar domes where bending waves tend to distort the sonar signal which passes through the dome as compressional waves.

A compressional wave, when acting on the structure, acts uniformly over its entire surface. A compressional wave applied to surface 1 is transmitted directly through the structure and leaves through skin 2. Because the greater part of the structure comprises the solid blocks 3 and because the damping material 4 in the gaps between the blocks would be deformed in bulk where it is very stiff (i.e., incompressible), the structure is substantially transparent to compressional waves which pass through the structure with little loss. The structure, accordingly, provides efficient transmission or reception of the compressional sonar waves while attenuating the bending or flexural waves excited by turbulent flow and other causes.

Another advantage of the structure is that damping of the flexural or bending waves may be varied in different directions by varying the length of the blocks. This is shown in FIG. 3, an isometric sketch with the top structural skin removed. The bottom structural skin 6 is fixed to blocks 7 which have a length in the X direction greater than in the Y direction. The blocks 7 would be similarly fixed to the upper skin which has been removed. The gaps between the blocks are filled with shear damping material 8. The width of the gaps 8 is small compared to the length of the blocks. The thickness of the blocks 7 and the rigid attachment to the top and bottom skins prevent bending of the over-all structure by flexural waves and confines or localizes the bending to the sections of the structure in the gaps between the blocks in the manner shown in FIG. 2. A flexural wave propagating in the Y direction encounters more damping material or junctions 8 than a flexural wave propagating in the X direction, and the damping accordingly is greater in the Y direction than in the X direction. The FIG. 3 structure is rigid in the direction perpendicular to the skins and therefore provides efficient transmission or reception of compression waves.

In the modification shown in FIG. 4, there are top and bottom skins 9 and 10 of structural material and rigid blocks 11 between and rigidly fixed to the opposed faces of the skins 9 and 10. The blocks 11 occupy the great majority of the skin area. In one of the gaps between adjacent blocks, there is a vertical spacer 13 of less width than the width of the gap and the balance of the space is filled with a viscous fluid 14. The spacer 13 need not be rigidly fixed to the skins 9 and 10. The purpose of the spacer 13 is to provide a relatively thin film of viscous fluid so as to increase the shear strain for damping bending waves. Bending waves cause deflection of the FIG. 4 structure in the same manner indicated in FIG. 2. The bending is confined to the local sections between points 15 and 16 with no bending in the areas fixed to the blocks 11. Under this localized bending, there is a shear of the viscous fluid which damps or attenuates the bending waves.

In the gap 17 there are several thin vertical spacers 18 in frictional contact with each other. The spacers 18 may be friction material or may be rigid plates coated with friction material 19. The bending wave causes localized bending to occur in the space between points 20 and 21 and the friction material 19 introduces damping attenuating the wave. The structure of FIG. 4 is rigid or transparent to compressional waves due to the rigidity of the blocks 11 and the rigid attachment thereof to the structural skins 9 and 10. Compressional waves pass through the skins with little or no damping. The structure is also rigid in bending or flexure due to the narrow gaps in which bending can take place. However, bending is subject to friction damping attenuating any bending waves.

What is claimed as new is:

1. An acoustic transmitting structure acoustically transparent to compressional waves normal to the skins and acoustically damped for bending or flexural waves and adapted for sonar domes and the like comprising spaced upper and lower skins of structural material, a plurality of rigid block means of structural material spaced from each other and having ends rigidly fixed respectively to the upper and lower skins, said skins being relatively flexible compared to the block means and the ends of said block means occupying the greater part of the area of the skins for preventing bending of the skins in the areas fixed to the ends of the block means and confining bending of the structure to the local portions of the skins in the spaces between the block means, and incompressible friction damping means filling the spaces between the block means and subjected to shear by bending of said local portions of the skins.

2. The structure of claim 1 in which the damping means is viscoelastic material having a modulus of elasticity less than one tenth the modulus of elasticity of the structural material and having a loss factor ten or more times greater than the loss factor of the structural material.

3. The structure of claim 1 in which the friction damping means comprises a viscous liquid.

4. The structure of claim 1 in which the friction damping means comprises spacers edgewise to the skins and in frictional contact with each other.

5. The structure of claim 1 in which the block means are elongated in one direction transverse to the thickness of the structure to produce less damping of bending waves in said one direction compared to the damping of bending waves in other directions transverse to the thickness of the structure.

References Cited
UNITED STATES PATENTS

| | | | |
|---|---|---|---|
| 2,884,084 | 4/1959 | Sussman | 181—0.5 |
| 3,078,948 | 2/1963 | Gildard et al. | 181—33 |
| 3,136,380 | 6/1964 | McCoy et al. | 181—0.5 |

BENJAMIN A. BORCHELT, *Primary Examiner.*

W. KUJAWA, *Assistant Examiner.*